June 28, 1966 R. L. ASHER 3,258,698

MODULATION CROSSOVER SELECTOR

Filed Oct. 4, 1963 2 Sheets-Sheet 1

INVENTOR.
RALPH L. ASHER
BY [signature]
ATTORNEY

June 28, 1966 R. L. ASHER 3,258,698

MODULATION CROSSOVER SELECTOR

Filed Oct. 4, 1963 2 Sheets-Sheet 2

INVENTOR.
RALPH L. ASHER
BY [signature]
ATTORNEY

United States Patent Office 3,258,698
Patented June 28, 1966

3,258,698
MODULATION CROSSOVER SELECTOR

Ralph L. Asher, New York, N.Y., assignor to International Telephone and Telegraph Corporation, Nutley, N.J., a corporation of Maryland Filed Oct. 4, 1963, Ser. No. 313,851
9 Claims. (Cl. 328—109)

This invention relates to modulation crossover selection circuits and more particularly to a digital modulation crossover selection circuit.

In digital systems for making angle measurements to reduce errors caused by jitter of the analog signal, several digital signals are averaged in the counters. The analog representation of the bearing function is sinusoidal. On the other hand, the digital form of bearing contains a sharp discontinuity at 360 degrees. In the Tacan navigation bearing system, these discontinuities exist at each 40 degree increment for the fine bearing indication. This would be troublesome if the modulation crossover occurs at one of these discontinuities. When the digital measurements are made, the signal may be measured on alternate sides of the discontinuity because of the signal jitter. During digital averaging process, this could result in a gross error (i.e., the average of 0° and 360° is 180°). As an example, assume a bearing signal occurs in one measurement at 350 degrees and in a second measurement, the same signal appears (because of jitter) at 10 degrees. The average of the two signals is 180 degrees. To remove this possibility, use is made of the fact that if the positive going modulation crossover (0 degrees) is at the discontinuity, then the negative going one (180 degrees) is far removed from it.

An object of this invention is to provide a modulation crossover selection circuit to eliminate ambiguity in a digital angle measurement scheme.

A feature of this invention is a modulation crossover selection circuit for selecting a crossover in a digital angle measuring system where the successive values of angles are integrated which comprises first and second crossover pulse signals, (representing respectively 0 degree and 180 degree crossover points), a source of reference pulse signals, means to derive a desired pulse signal a predetermined time after each said reference pulse, and means responsive to said desired pulse signal and the one of said first and second crossover pulse signals occurring after the generation of said desired signal to generate output signals indicative of the selected crossover.

The above-mentioned and other features and objects of this invention will become more apparent by reference to the following description taken in conjunction with the accompanying drawings, in which.

Figure 1:
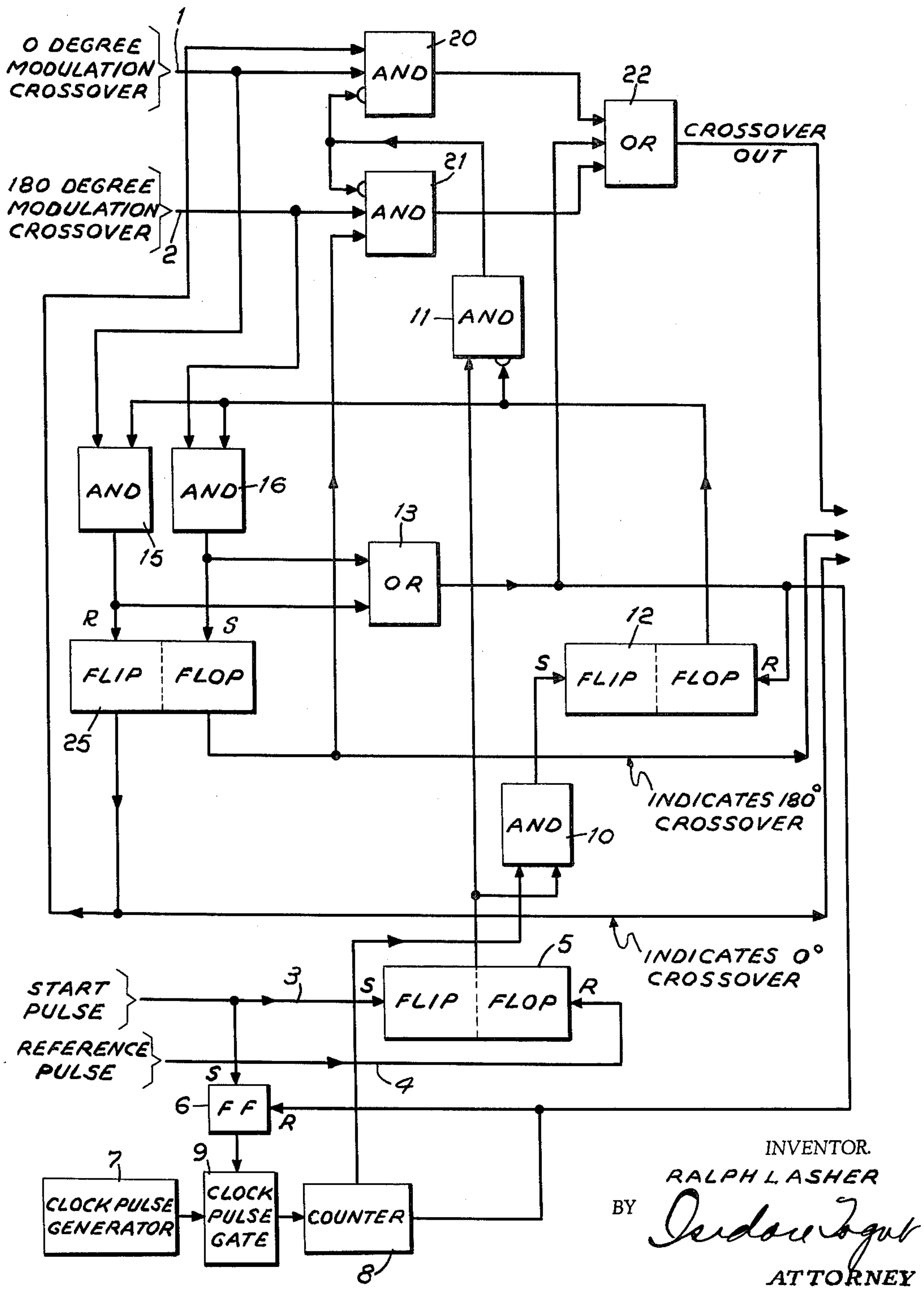
FIG. 1 is a block diagram of my invention.

Referring now to FIG. 1, which shows the logic circuitry for my invention, there are shown two input pulse signals, one representing the 0 degree modulation crossover and the other the 180 degree modulation crossover, coupled to leads respectively numbered 1 and 2. These signals are derived from a crossover detector circuit (not shown). A sequencer start pulse signal is fed into lead 3 and a reference pulse is coupled to lead 4. The sequencer start pulse starts the operation of this circuit as will be described and occurs, for example, in Tacan operation once every 530 milliseconds. The reference pulse may be, for example, as in Tacan, the North reference burst which occurs at the rate of 15 c.p.s. The sequencer pulse is time coincident with the reference pulse and for each sequencer pulse, there are eight reference pulses in this example. As will be made apparent later, this means that there can be secured eight values of a particular angle for averaging. The sequencer start pulse is coupled to a flip-flop circuit, bistable multivibrator 5 and bistable multivibrator 6. A clock pulse generator 7 is coupled to a counter 8 by a gate 9, to which is also coupled the output of bistable multivibrator 6. The output of counter 8 which is a pulse at 80 degrees after a reference pulse, is coupled to an AND circuit 10. The reference pulse is coupled to bistable multivibrator 5. The output of bistable multivibrator 5 is coupled to AND circuit 10 and AND circuit 11. AND circuit 10 output is coupled to bistable multivibrator 12, as is the output from OR circuit 13. Bistable multivibrator 12 is coupled to AND circuits 11, 15 and 16. AND circuit 11 output is fed to AND circuits 20 and 21. Crossover modulation input signals 1 and 2 are fed respectively to AND circuits 16, 20 and 15, 21. The outputs of AND circuits 20 and 21 are fed to OR circuit 22, together with the output of OR circuit 13. Bistable multivibrator 25 has two outputs; one output is fed to AND circuit 21 and is an output of this selector circuit that indicates that the selected crossover is 180 degrees, the other output is fed to AND circuit 20 and is an output of this selector circuit that indicates that the selected crossover is 0 degrees. The output of OR circuit 22 is a signal that a crossover has been selected and the succeeding selected crossovers, which one it is, the output of multivibrator 25 indicates.

AND circuits 10, 15 and 16 are of the type described in pages 397–400 of the publication "Pulse and Digital Circuits" by Millman and Taub, published by McGraw-Hill Book Company, Inc., 1956. AND circuits 11, 20 and 21 are of the type described on pages 401–404 of the above-mentioned publication and have one inhibitor circuit denoted by the circle, which AND circuits have the property that an output pulse will appear if and only if pulses are applied to all the inputs and no pulse is applied at the inhibitor input.

Figure 2:
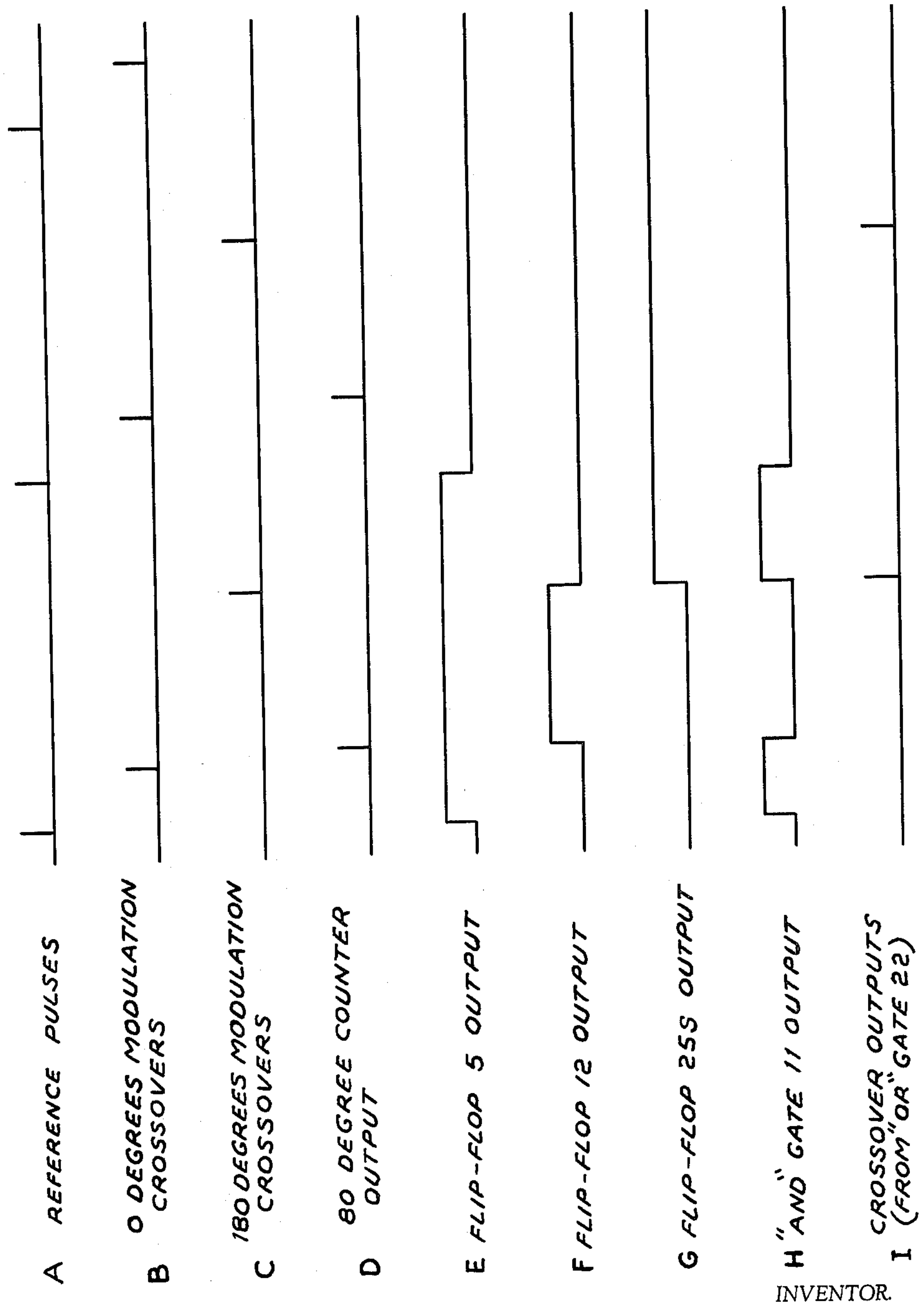
FIG. 2 is a group of waveforms useful in explaining the operation of this invention.

The operation of this modulation crossover selection circuit is as follows. The modulation crossover selector circuit selects a crossover which is far removed from the 0°–360° numerical discontinuity. Initially all modulation crossovers are inhibited from passing through AND circuits 15 and 16 to multivibrator 25, the crossover selection switch. When the angle measuring operation begins as indicated by receipt of a sequencer start pulse, the control switch, multivibrator 5 is triggered to the set position. This inhibits any modulation crossovers from passing through AND circuits 20 and 21 and entering the OR circuit output 22 (see waveform E, FIG. 2). Since the output of multivibrator 5 provides a signal to AND circuit 11 and since initially no voltages appears at the AND circuit 11 inhibit circuit input, the output of the inhibit circuit is a voltage that enables the AND circuit 11 to produce an output signal. This output signal fed to the input of the inhibit circuit of AND circuits 20 and 21 with consequently no output from the inhibit circuit into the AND circuit 20, therefore inhibits any output from AND circuits 20 and 21. The sequencer start pulse triggers multivibrator 6 to open the clock pulse gate 9 and the clock pulses are fed into the counter 8 which begins to count up. When the counter 8 reaches the correct point it delivers an output pulse which is 80° removed from the reference pulse (waveform D). The 80° pulse derived from the counter 8 passes through AND circuit 10 which is enabled by multivibrator 5 being in the set condition. The AND circuit 10 output signal triggers multivibrator 12 to the set condition which now enables AND circuits 15 and 16 and inhibits an output from AND circuit 11. The output from multivibrator 12 fed to the input of the inhibit circuit of AND circuit 11 is inverted to no signal input to the AND circuit 11 thereby disabling AND circuit 11 and inhibiting any output from AND circuit 11. No output from AND circuit 11 means an input signal to AND circuits 20 and 21 from the inhibitor circuits thereof, thereby enabling either AND circuit 20 and 21 when the other two inputs to each, the crossover modulation signals, and an output signal from multivibrator 25 occurs. The next modulation crossover to follow the 80 degree pulse will turn the crossover selector switch, multivibrator 25, to state 1 (set condition), if it is a 180 degree crossover or to a state 0 (reset condition) if it is a 0 degree crossover (waveform G). Either output of the AND circuits 15 and 16 will produce an output of OR circuit 13 which will reset multivibrators 6 and 12 (waveform F) and counter 8. This removes the output from multivibrator 12 which inhibits AND circuits 15 and 16, therefore locking multivibrator 25 to the selected position, in this case, the set condition. Thus, we get an output from 25 which, in the case shown, is the signal indicating 180° crossover.

When the next reference pulse following the sequencer start pulse is received, multivibrator 5 is reset (waveforms E and H). It removes the enabling signal from AND circuit 10 so that multivibrator 12 is maintained inoperative during this cycle of crossover selection. The selected modulation crossovers now pass through either AND circuit 20 or 21, depending upon the state of multivibrator 25.

While I have described above the principles of my invention in connection with specific apparatus, it is to be clearly understood that this description is made only by way of example and not as a limitation to the scope of my invention as set forth in the objects thereof and in the accompanying claims.

I claim:

1. A modulation crossover selector circuit for selecting a crossover in a digital angle measuring system where the values of angles are integrated, means providing first and second crossover pulse signals representing, respectively, 0° and 180° crossover points, a source of reference pulse signals, means to derive a desired pulse signal a predetermined time after each said reference pulse, and means responsive to said desired pulse signal and the one of said first and second crossover pulse signals first occurring after the generation of said desired signal to generate output signals indicative of the selected crossover.

2. A modulation crossover selector circuit according to claim 1 further comprising a start pulse signal coincident with a reference signal and means responsive to said start pulse signal and said reference signal to inhibit any output of the crossover selector circuit.

3. A modulation crossover selector circuit according to claim 2 wherein said inhibiting means comprises a first bistable multivibrator, means coupling said start pulse signal and said reference signal to said first bistable multivibrator to place said multivibrator in the set condition, a first AND circuit, means coupling the output of said first multivibrator to said first AND circuit, whereby when said first multivibrator is in the set condition the output of said first multivibrator causes said AND circuit to produce an inhibit signal.

4. A modulation crossover selector circuit according to claim 3, further comprising a second AND circuit, a second bistable multivibrator, means coupling said 80 degree pulse and the output of said first multivibrator to said second AND circuit, means coupling the output of said second AND circuit to said second bistable multivibrator to place said second multivibrator in the set condition whereby an output is produced from said second multivibrator, and means coupling said second multivibrator output to said first AND circuit to disable said first AND circuit and remove said inhibiting signal.

5. A modulation crossover selector circuit according to claim 4 further comprising third and fourth AND circuits, means coupling said first crossover pulse signals to said third AND circuit, means coupling said second crossover signals to said fourth AND circuit, a third multivibrator, means coupling the outputs of said third and fourth AND circuits to the inputs of said third multivibrator, means coupling the output of said second multivibrator to said third and fourth AND circuits, whereby an output from either of said third and fourth AND circuits first occurring will place said third multivibrator in the condition for producing an output signal indicating the first crossover pulse signal to arrive after the output signal from said second multivibrator, said first crossover pulse signal being the selected crossover.

6. A modulation crossover selector circuit according to claim 5 further comprising fifth and sixth AND circuits, means coupling said first and second crossover pulse signals respectively to said fifth and sixth AND gates, means coupling the respective outputs of said third multivibrator to said fifth and sixth AND circuits, means coupling said inhibit signal to said fifth and sixth AND circuits, whereby on removal of said inhibit signal and the occurrence of an output from any state of said third multivibrator an output from either of said fifth and sixth AND circuits will occur indicating a crossover pulse signal.

7. A modulation crossover selector circuit according to claim 6 further comprising a first OR circuit, means coupling the outputs of said third and four AND circuits to said first OR circuit and means coupling the output of said OR circuit to said second bistable multivibrator whereby the output of said first OR circuit will place said second multivibrator in the reset condition and prevent any output from said second multivibrator and from said third and fourth AND circuits and locking said third multivibrator to the selected crossover condition.

8. A modulation crossover selector circuit according to claim 7 wherein on receipt of a next reference pulse following said start pulse signal said first multivibrator is placed in the reset condition and no output from said first multivibrator results and said second multivibrator is maintained inoperative during the cycle instituted by said start pulse.

9. A modulation crossover selection circuit according to claim 1 wherein said desired pulse signal occurs 80 degrees after said reference pulse.

References Cited by the Examiner

UNITED STATES PATENTS

| | | | |
|---|---|---|---|
| 2,693,907 | 11/1954 | Tootill | 328—92 X |
| 2,802,105 | 8/1957 | Odden | 328—28 |
| 2,999,637 | 9/1961 | Curry | 307—88.5 X |

ARTHUR GAUSS, *Primary Examiner.*

M. LEE, J. JORDAN, *Assistant Examiners.*